3,284,422
PROCESS FOR POLYMERIZING VINYL AND ACRYLIC ESTERS WITH ALLYL ACRYLATE WHEREIN AN ALUMINUM ALKYL AND OXYGEN ARE USED AS CATALYSTS

Rajendra N. Chadha, Silver Spring, Md., assignor to W. R. Grace & Co., New York, N.Y., a corporation of New York
No Drawing. Filed Sept. 25, 1963, Ser. No. 311,336
3 Claims. (Cl. 260—80.5)

This invention relates to an improvement in a novel polymerization process of vinyl and related monomers. More particularly, it is directed to a process for increasing the percent conversion of vinyl-type monomers, i.e., ethylenically unsaturated monomers, such as butyl acrylate by the use of allyl acrylate without using any co-catalysts.

In summary, this invention is directed to a process for polymerizing a vinyl monomer, including mixtures of vinyl monomers, with a catalyst of an aluminum alkyl with free oxygen (e.g., air), and with a minor amount of allyl acrylate to crosslink the resulting polymer to increase the conversion of monomer to polymer. In addition, this invention is directed to a copolymer product containing a vinyl monomer group, allyl acrylate as a bifunctional cross-linking agent, and an aluminum alkyl compound.

An object of this invention, therefore, is to provide an improved method for obtaining high conversions in vinyl type monomers, without the use of co-catalysts in an oxygen atmosphere. A further object is to provide a method whereby cross-linking of the polymer is attained to such a high degree as to reduce cracks usually observed in non-crosslinked films to microcracks, noticeable only under magnification. A further object is to provide a method whereby high conversions with good crosslinking are reached in very little time. Other objects will become apparent as the description of the invention proceeds.

In French Patent Number 1,302,226, issued September 30, 1961, and assigned to the same assignee, it was disclosed that vinyl monomers may be polymerized in the presence of a catalyst consisting essentially of an aluminum alkyl and free oxygen (e.g., air), at low temperatures. Such a catalyst system, however, as will be shown hereinafter, is oxygen sensitive and percent conversion decreases as the ratio of $O_2$ to aluminum alkyl increases. Thus for optimum conversion it is necessary to perform the polymerization in a system where the amount of oxygen can be regulated instead of in air. For commercial purposes, however, a polymerization system operable in air is extremely useful. Such systems operable in air are known in the art, but usually involve catalyst-cocatalyst mixtures. Therefore, it would also be helpful to reduce the complexity of catalyst-cocatalyst systems without adversely affecting conversion ratios.

It is the novelty of this invention that it is an air-operable system, possesses a simple catalyst, which is aluminum alkyl in oxygen or air, and also has a high conversion rate accompanied by a high degree of crosslinking, by virtue of the addition of allyl acrylate as a bifunctional crosslinking agent to the vinyl monomer.

The expression "vinyl monomer" is used to signify a non-gaseous (i.e., liquid or solid) compound of the formula

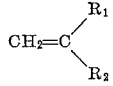

wherein $R_1$ is hydrogen or an organic radical and $R_2$ is an organic radical. The vinyl monomers are well known in the art and include such material as acrylic acid esters, vinyl esters, allyl esters, vinyl nitriles, styrenes, and the like. Among the suitable acrylic acid esters which can be employed in the present invention are: methyl acrylate; ethyl acrylate; n-butyl acrylate; 3,5,5-trimethylhexyl acrylate; cyclohexyl acrylate; 2-n-butoxyethyl acrylate; and others.

Other suitable vinyl monomers include: acrylamide; allyl anthranilate; 2-bromoethyl methacrylate; 2-chlorostyrene; beta-cyanoethyl methacrylate; vinyl ethyl ether; vinyl acetate, and others. The monomers may be used individually or in various combinations.

The "alkyl aluminum compounds" useful in the practice of the present invention are any of the well known class compounds having the formula

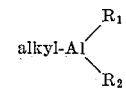

wherein $R_1$ and $R_2$ are each hydrogen, halogen, or alkyl radicals. Among the various alkyl aluminum compounds which can be employed are tri-ethyl aluminum; diisobutyl aluminum hydride; diethyl methyl aluminum; diisobutyl aluminum chloride and the like. The alkyl aluminum compounds can be employed individually or in various mixtures. The amount of alkyl aluminum compound used should be about 0.3–10 weight percent of the total polymerizable mixture.

The bifunctional crosslinking agent allyl acrylate, due to the two double bonds, polymerized itself in the presence of the aluminum alkyl catalyst, as will be shown hereinafter. Thus, when the crosslinking agent is used in the presence of the parent monomer to be polymerized, it forms polymeric crosslinks throughout the finished resin. The term "bifunctional" is used to mean a monomer having two sites at which it can polymerize or crosslink; specifically, allyl acrylate. It is preferred to use about 3–20% of allyl acrylate by weight of vinyl monomers in the polymerizing mixture.

In carrying out the polymerization process of the present invention, the reactants are to be mixed in an inert atmosphere, such as nitrogen, or the noble gases, then a sample exposed to the air and reaction allowed to proceed until it stops.

The following examples are given to illustrate the invention, and are not intended to limit it in any manner.

In Example I, no allyl acrylate is used in the polymerization reaction. In Examples I to VI, allyl acrylate is used as a crosslinking agent in various ratios with the monomer to be polymerized. In Example VII, a mixture of monomers is polymerized in the absence of allyl acrylate. In Example VIII, the mixture of monomers is polymerized using allyl acrylate as a crosslinking agent. In Table I, these examples are summarized with indication of the physical properties of the finished polymers.

As demonstrated by the examples, the polymerization readily proceeds at room temperature. However, lower or higher temperatures may be employed, if desired, as the reaction is exothermic and proceeds readily even at low temperatures.

While in the examples unmodified compositions are produced, it is obvious that other materials such as dyes, pigments, fibers, co-monomers and other polymers may be introduced into the compositions of the present invention. Usually, no substantial alteration of the physical properties of the products formed can be observed, but certain pigment additions, such as ZnO, $TiO_2$, $Fe_2O_3$ and like metal oxides, produce a rubbery, elastic film particularly suitable for use in a can sealing composition. These metallic oxides can be added to the mixture to the extent of 3–5% by weight, to produce this elastic effect. Lesser or greater quantities produce only the normal pigment effect, and the polymer possesses the pure polymer qualities. Other compositions produced through this invention can be brushed or sprayed onto a surface to form protective films for wood, metal and the like. They may also be applied to glass surfaces to form a safety film on the glass. In addition, the compositions may be formed into films which are suitable for wrapping materials, moisture barriers, and similar products.

Many equivalent modifications will be apparent to those skilled in the art from a reading of the foregoing without a departure from the inventive concept.

EXAMPLE I

Control

A 16 x 150 mm. test tube was baked in an oven at 200° C. for two days to remove adsorbed $O_2$ on glass surface. The tube was then flushed with $N_2$, a self-sealing rubber stopper was inserted, and $N_2$ was passed through the tube for 15 minutes to provide a pure inert atmosphere within the tube, after which was added 4.5 cc. butyl acrylate and 0.5 cc. of a 50% solution of diisobutyl aluminum hydride (DIBAH) in hexane, via syringe. Heat was generated and excess pressure was bled off through a pinhole in the rubber stopper. When the tube had cooled to room temperature, an $N_2$-flushed hypodermic syringe was used to extract 1 cc. of the mixture onto a pre-weighed glass plate. The mixture was allowed to harden in air at room temperature. Then the glass plate was reweighed to obtain percent conversion, which was about 38%.

Hardening is initiated within about 5 minutes, or when a crust is formed. The film hardens within 8–24 hours.

EXAMPLE II

Using the procedure of Example I, 4.25 cc. of butyl acrylate were added to 0.25 cc. of allyl acrylate and 0.5 cc. DIBAH solution; percent conversion was 48.5%.

EXAMPLE III

Using procedure of Example I, 4.0 cc. of butyl acrylate were added to 0.25 cc. allyl acrylate and 0.75 cc. DIBAH solution; percent conversion was 54.4%.

EXAMPLE IV

The procedure used in Example I was repeated, except that 4.0 cc. of butyl acrylate were combined with 0.5 cc. allyl acrylate and 0.5 cc. of the DIBAH solution. Using the technique of Example I, percent conversion was found to be 58.8% of theory.

EXAMPLE V

Using the procedure of Example I, 3.75 cc. butyl acrylate were added to 0.50 cc. allyl acrylate and 0.75 cc. DIBAH solution; percent conversion was 59.1%.

EXAMPLE VI

The procedure used in Example I was followed, except that 3.5 cc. butyl acrylate were added to 0.75 cc. allyl acrylate and 0.75 cc. DIBAH solution; percent conversion was 60.2%.

EXAMPLE VII

Control

Using the procedure of Example I, a mixture of 4.0 cc. butyl acrylate and 0.5 cc. vinyl acetate was added to 0.5 cc. DIBAH solution; percent conversion was 53.9%.

EXAMPLE VIII

Using procedure of Example I, a mixture of 4.0 cc. butyl acrylate and 0.5 cc. vinyl acetate was added to 0.5 cc. allyl acrylate and 0.5 cc. DIBAH solution; percent conversion was 75.4%.

It should be noted that in Examples I and VII, in which no allyl acrylate was added, the finished polymers exhibited large cracks, easily visible to the naked eye. However, in Examples II–VI and VIII, these cracks were reduced to micro cracks, difficult to see except under magnification. Also, the addition of the allyl acrylate to said examples materially increased percent conversion over the examples without the addition of allyl acrylate. These results are summarized in Table I.

EXAMPLE IX

Using the procedure of Example I, a mixture of 4.0 cc. butyl acrylate containing 0.17 gm. ZnO was added to 0.5 cc. allyl acrylate and 0.5 cc. DIBAH solution: Percent conversion was 59.3%. The resultant film was rubbery, possessing elastic properties.

TABLE I.—CONVERSIONS OBTAINED BY USING ALLYL ACRYLATE AS A CROSSLINKING AGENT

| Example No. | Butyl Acrylate | | Allyl Acrylate | | Vinyl Acetate | | DIBAH (50% solution in hexane) | | Percent Conversion | Properties of Film |
| --- | --- | --- | --- | --- | --- | --- | --- | --- | --- | --- |
|  | Cc. | Gms. | Cc. | Gms. | Cc. | Gms. | Cc. | Gms. |  |  |
| 1. Control | 4.5 | 4.07 |  |  |  |  | 0.50 | 0.250 | 38 | Medium hard, transparent, large cracks. |
| 2 | 4.0 | 3.57 | 0.50 | 0.461 |  |  | 0.50 | 0.350 | 58.8 | Hard, transparent, micro cracks. |
| 3 | 3.5 | 2.67 | 0.75 | 0.691 |  |  | 0.75 | 0.375 | 60.2 | Do. |
| 4 | 4.0 | 3.57 | 0.25 | 0.230 |  |  | 0.75 | 0.375 | 54.4 | Do. |
| 5 | 4.25 | 40.2 | 0.25 | 0.230 |  |  | 0.50 | 0.250 | 48.5 | Do. |
| 6 | 3.75 | 3.12 | 0.50 | 0.461 |  |  | 0.75 | 0.375 | 59.1 | Do. |
| 7. Control | 4.0 | 3.570 |  |  | 0.5 | 0.461 | 0.50 | 0.250 | 53.9 | Hard, transparent, large cracks. |
| 8 | 4.0 | 3.570 | 0.50 | 0.461 | 0.5 | 0.461 | 0.50 | 0.250 | 75.4 | Hard, transparent, micro cracks. |

What is claimed is:

1. The process of polymerizing a member of the vinyl monomer group consisting of acrylic and vinyl esters in the presence of a catalyst consisting essentially of free molecular oxygen and 0.3 to 10% by weight of an aluminum alkyl compound of the formula

in which R is alkyl and R' is a member of the group consisting of hydrogen, halogen and alkyl, all of said alkyls containing 1 to 8 carbon atoms, and, additionally in the presence of a 3–20% by weight of a bifunctional cross-linking agent consisting of allyl acrylate; percentages based on the total weight of the vinyl monomer present in the composition, which comprises admixing said vinyl monomer group and said allyl acrylate with said aluminum alkyl compound in an inert atmosphere, and then exposing said mixture to free oxygen until the reaction stops.

2. The process of claim 1 in which the vinyl monomer is butyl acrylate.

3. The process of claim 1 in which the vinyl monomer is a mixture of butyl acrylate and vinyl acetate.

References Cited by the Examiner

UNITED STATES PATENTS 2,456,647   12/1948   Rehberg et al. _____ 260—86.1
3,117,112   1/1964   Mirable et al. _____ 260—89.5
3,198,772   8/1965   Chadha _____ 260—80.5

JOSEPH L. SCHOFER, *Primary Examiner.*

W. HOOVER, *Assistant Examiner.*